United States Patent [19]

Kiemle et al.

[11] 4,378,252
[45] Mar. 29, 1983

[54] MAGNETIC SEPARATION TO IMPROVE PURITY OF IRON OXIDE PIGMENTS

[75] Inventors: Peter Kiemle; Franz Hund, both of Krefeld; Ingo Pflugmacher, Meerbusch; Wolfgang Rambold, Krefeld, all of Fed. Rep. of Germany

[73] Assignee: Bayer Aktiengesellschaft, Leverkusen, Fed. Rep. of Germany

[21] Appl. No.: 268,291

[22] Filed: May 29, 1981

[30] Foreign Application Priority Data

Jun. 19, 1980 [DE] Fed. Rep. of Germany ....... 3022875

[51] Int. Cl.³ .............................................. C09C 1/24
[52] U.S. Cl. ...................................... 106/304; 209/39; 209/232; 423/633
[58] Field of Search ................ 106/304; 423/151, 152, 423/633; 209/39, 232

[56] References Cited

U.S. PATENT DOCUMENTS

| | | | |
|---|---|---|---|
| 1,368,748 | 2/1921 | Penniman et al. | 423/633 |
| 2,287,440 | 6/1942 | McCleary et al. | 423/152 X |
| 3,567,026 | 3/1971 | Kolm | 210/222 |
| 3,734,996 | 5/1973 | Bade et al. | 423/633 X |
| 3,755,554 | 8/1973 | Lailiach et al. | 106/304 |
| 3,887,457 | 6/1975 | Marston et al. | 209/232 X |
| 3,946,103 | 3/1976 | Hund | 423/633 |
| 3,947,502 | 3/1976 | Leitner et al. | 423/633 X |
| 4,005,008 | 1/1977 | Oder | 209/232 X |
| 4,053,325 | 10/1977 | Vanderheiden | 106/304 |
| 4,217,213 | 8/1980 | Schuster | 210/42 S |
| 4,281,799 | 8/1981 | Oder | 209/39 X |
| 4,299,635 | 11/1981 | Dickerson | 106/304 X |

FOREIGN PATENT DOCUMENTS 515758 1/1931 Fed. Rep. of Germany .
56-7287 2/1981 Japan .................................. 209/39

OTHER PUBLICATIONS

Sproull, R. L., Modern Physics, pub. by Wiley and Sons, NYC (1965), pp. 322–333.
Gupta, A. et al, "A New Method of Magnetic Separation of Ferro- and Para- Magnetic Minerals From Feebly Magnetic and Non-Magnetic Minerals", Proc., Australas. Inst. Min. Metall., Jun. 1980, (274), pp. 23–35.

Primary Examiner—Helen M. McCarthy
Attorney, Agent, or Firm—Sprung, Horn, Kramer & Woods

[57] ABSTRACT

A process for increasing the color purity of iron oxide pigment particles admixed with color-modifying impurities and obtained by the Penniman process or the aniline process, comprising introducing the particles into a magnetic field, and removing from the magnetic field two fractions of different magnetizability, the first fraction being iron oxide pigment particles of increased color purity and the second fraction being enriched in impurities.

3 Claims, 2 Drawing Figures

MAGNETIC SEPARATION TO IMPROVE PURITY OF IRON OXIDE PIGMENTS

This invention relates to a process for the production of iron oxide pigments having improved purity of color by applying the principle of magnetic separation and to the use of these pigments.

The production of α-FeOOH/iron oxide yellow pigments is effected by various processes, including the aniline process and the Penniman process (German Pat. No. 515,758, U.S. Pat. No. 1,368,748).

In the aniline process, the reduction of nitrobenzene to aniline using metallic iron is controlled such that substantially pure α-FeOOH is formed. In the Penniman process, metallic iron is oxidized with air in the presence of α-FeOOH nuclei.

Dark-colored impurities can be formed in the production of iron oxide yellow pigments by the abovementioned processes or by other processes, the impurities being introduced into the product either from the starting materials or from the apparatus. These dark-colored impurities seriously affect the color properties of pure and light-colored pigments. Conversely, the presence of yellow α-FeOOH in iron oxide black pigments also leads to a reduction in the color strength. Hitherto, there has been no possibility of improving the color properties of pigments containing such impurities.

Accordingly, the object of the present invention is to separate from the pigments these finely-divided impurities which have an adverse effect upon color properties.

It has surprisingly been found that the separation of these small quantities of differently colored impurities from relatively large quantities of finely-divided iron oxide pigments may be carried out advantageously by magnetic separation.

The process of magnetic separation was in use as long ago as the end of the last century for separating substances differing from one another in their magnetic power. At that time, this process was used particularly in the dressing of ores, particularly iron ores. Recently, magnetic separation has also been used for the purification of kaolins (German Offenlegungsschrifts Nos. 2,420,436 and 2,534,044), the iron-containing magnetizable impurities being separated from the diamagnetic kaolins by magnetic separation.

German Auslegeschrift No. 2,758,229 describes the simultaneous production of gypsum and magnetite. In this process, iron(II)sulphate is reacted with limestone and air and the corresponding mixture of substantially equal parts of gypsum and magnetite is separated by magnetic separation.

The present invention provides a process for the production of iron oxide pigments obtained by the Penniman or aniline process and having increased purity of color, characterized in that particles of relatively high magnetizability are separated by magnetic separation. The particles of relatively high magnetizability may be both impurities and also iron oxide pigments themselves.

The magnetic separation process is carried out with particular advantage in suspension before the last drying step. It may be carried out before, during or after an optional inorganic and/or organic aftertreatment of the pigments.

The effect of magnetic separation may be enhanced by the addition of suitable conditioning agents to the pigment suspension to be purified. Suitable conditioning agents for iron oxide pigment suspensions are, for example, phosphate, silicate, citrate, malate and tartrate anions.

The iron oxide pigments produced by the process according to the invention may be used both for pigmenting lacquers, plastics, aqueous dispersions and building materials and also as a starting material for the production of magnetic recording materials.

BRIEF DESCRIPTION OF THE DRAWINGS

The invention will be further described with reference to the accompanying drawings wherein.

Figure 1:
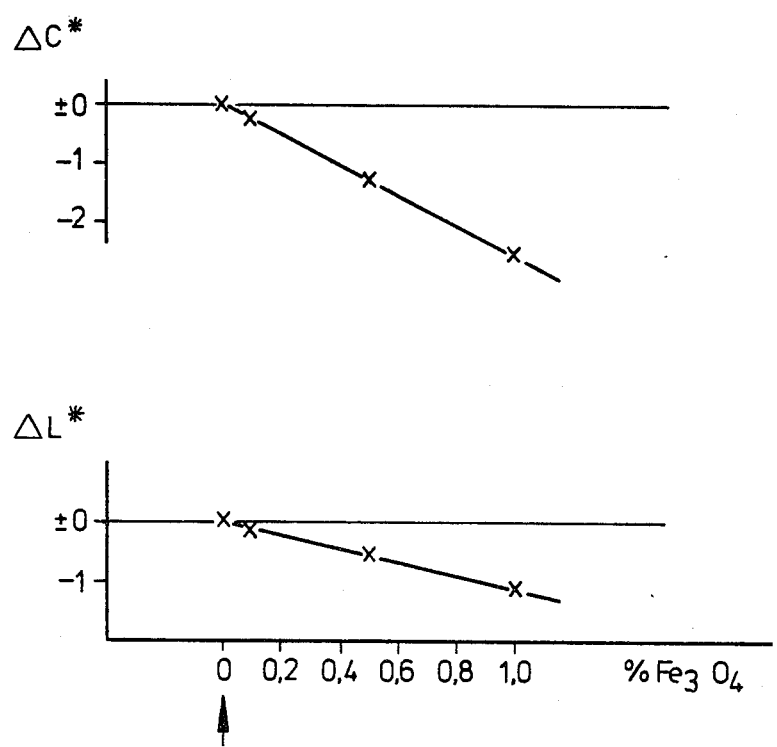
FIGS. 1 (a) and (b) are graphs showing the effect of impurities on color saturation and lightness of iron oxide pigments.

Referring now more particularly to the drawings, FIG. 1 demonstrates that even small amounts of dark-colored impurities are sufficient to impair to a considerable extent the color properties of pure pigments. Specifically, an aqueous suspension of a pure standard commercial-grade iron oxide yellow pigment (Bayferrox 1420, a product of BAYER AG) was intensively mixed with different quantities of black, finely-divided magnetite ($Fe_3O_4$). BAYER AG's iron oxide black type 320 was used as a representative of dark-colored impurities.

The mixtures thus prepared were filtered, the filtered material was dried and the color values of the pigment mixture was determined. The color values were determined in pure clay (DIN 55 985) using the CIELAB method (DIN 6174) (cf. also Ullmann's "Enzyklopaedie der technischen Chemie", 4th Edition, Vol. 18, page 559, Weinheim 1979). FIG. 1 shows the effects of the impurities on the color purity of the pigments. The color saturation represents the distance of the tested sample from the no-color point in the color space. The larger this value, the purer the colors. The pigments are also required to be as light as possible.

FIG. 1 (a) shows the change in color saturation ($C^*$) and FIG. 1(b) the change in lightness ($L^*$) in CIELAB units. A change of 0.5 unit in saturation and lightness can easily be detected with the naked eye in the case of yellow pigments.

Figure 2:
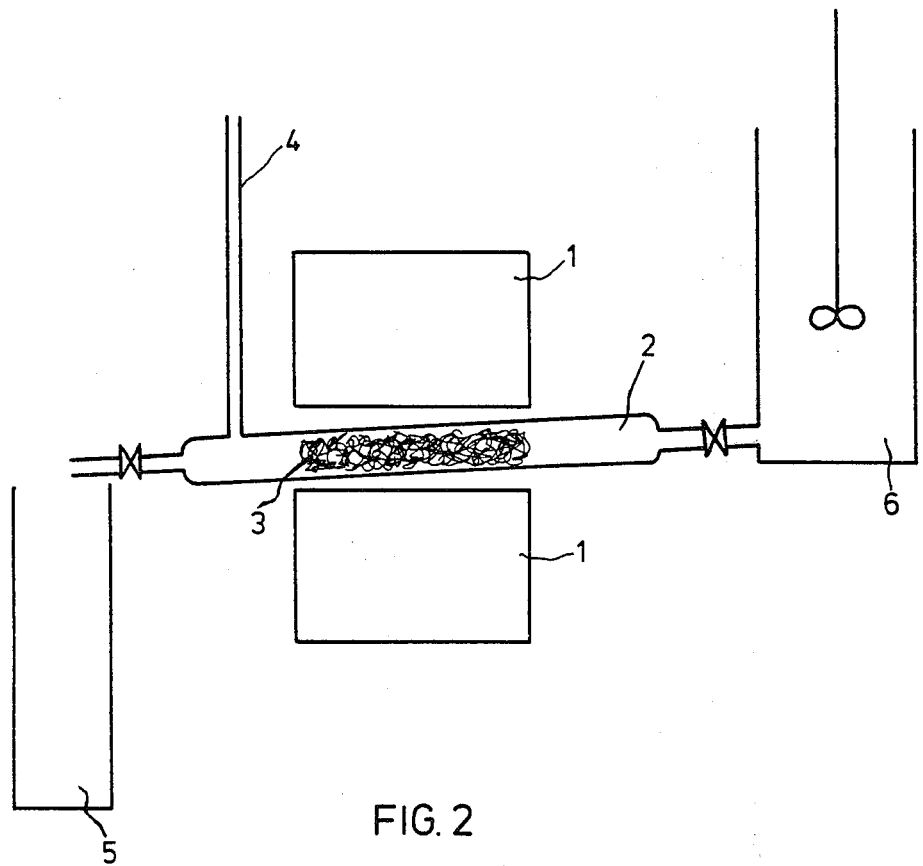
FIG. 2 is a schematic flow sheet of a process and apparatus for carrying out the present invention.

FIG. 2 shows the apparatus employed for carrying out the processes of the non-limiting examples hereinbelow.

Glass tube (2) filled with steel wool (3) to increase the field gradient is arranged in an electromagnet (1) having a field strength of about 4 kOe. The pigment suspension to be tested is passed through the tube from the storage vessel (6) provided with a stirrer and collected in the receiver (5). A pipe (4) is used for ventilation.

EXAMPLE 1

1000 ml of a suspension (solids content 50 g/l) of a washed iron oxide yellow sludge containing $Fe_3O_4$ and C produced by the aniline process with cast iron turnings (German Pat. No. 515,758) are passed through the apparatus illustrated in FIG. 2 in 5 minutes. The suspension is filtered and the pigment is dried at 140° C. The measured color values of the yellow pigment compared with the non-magnetically purified comparison sample are as follows:

| | $L^*$ | $C^*$ | $\Delta L^*$ | $\Delta C^*$ |
|---|---|---|---|---|
| Comparison sample without | | | | |

-continued

|  | L* | C* | ΔL* | ΔC* |
|---|---|---|---|---|
| magnetic separation | 49.5 | 3.4 | | |
| | | | +2.0 | +3.7 |
| Sample after magnetic separation | 51.5 | 37.1 | | |

The Δ-values reflect the improvement in color obtained by magnetic separation.

EXAMPLE 2

In this Example the required product is retained by magnetic separation while the non-magnetic impurities are washed out. 1000 ml of a washed iron oxide black sludge —$Fe_3O_4$— (50 g/l) are passed through the laboratory apparatus illustrated in FIG. 2 in 5 minutes. The apparatus is rinsed with water after the magnetic field has been switched on. The product deposited on the steel wool is then removed with 500 ml of water after the magnetic field has been switched off, the suspension obtained is filtered and the filtered product is dried. The strength of color (as determined in accordance with DIN 53234) of the iron oxide black pigment isolated in this way amounted to 107% in comparison with the magnetically nonpurified starting material.

| Remission values | $R_x$ | $R_y$ | $R_z$ | Strength of color (%) |
|---|---|---|---|---|
| Magnetically non-purified comparison sample | 20.94 | 20.97 | 21.74 | 100 |
| Magnetically purified sample | 20.06 | 20.27 | 21.45 | 107 |

EXAMPLE 3

A washed sample of an iron oxide yellow sludge is adjusted to a solids content of 175 g/l and heated with stirring to 80° C. 0.50% of $P_2O_5$ is then added as $Na_4P_2O_7$ in the form of an aqueous solution (25 g/l) with continued stirring over a period of 30 minutes, followed by stirring for another 30 minutes at 80° C. The suspension is diluted to 50 g/l and 1 liter thereof is passed through the magnet in 5 minutes.

| Color values: | L* | C* | Color distance ΔL* | ΔC* |
|---|---|---|---|---|
| Sample before magnetic purification | 51.1 | 37.7 | | |
| | | | +4.2 | +6.9 |
| Sample after magnetic purification | 55.3 | 44.6 | | |

A reduction in the carbon content of the tested pigments was surprisingly observed after magnetic separation on an iron oxide yellow (α-FeOOH) produced by the aniline process:
C-content before magnetic separation: 0.61%
C-content after magnetic separation: 0.10%

EXAMPLE 4

A washed sample of an iron oxide yellow sludge is adjusted to a solids content of 175 g/l, heated with stirring to 80° C. and then adjusted to pH 9 with NaOH. 0.1% of $SiO_2$ in the form of Na-water-glass in 100 ml of water is then added over a period of 30 minutes. The pH-value is then adjusted to neutral with dilute sulphuric acid over a period of 30 minutes. The pigment suspension is diluted to a solids content of 50 g/l and 1 liter thereof is passed through the magnet in 5 minutes.

| Color values: | L* | C* | Color distance ΔL* | ΔC* |
|---|---|---|---|---|
| Sample before magnetic separation | 51.4 | 37.7 | | |
| | | | +4.1 | +6.4 |
| Sample after magnetic separation | 55.5 | 44.1 | | |

EXAMPLE 5

The procedure is the same as described in Example 3 except that the following conditioning agents are used:
(a) 0.1% of sodium citrate;
(b) 0.1% of sodium tartrate;
(c) 0.1% of malic acid.

| Color values Example | | L* | C* | Color distance L* | C* |
|---|---|---|---|---|---|
| (a) | before magnetic separation | 51.4 | 37.1 | | |
| | | | | +3.1 | +5.3 |
| | after magnetic separation | 54.5 | 42.4 | | |
| (b) | before magnetic separation | 51.4 | 37.1 | | |
| | | | | +2.6 | +4.5 |
| | after magnetic separation | 54.0 | 41.6 | | |
| (c) | before magnetic separation | 51.4 | 37.1 | | |
| | | | | +2.9 | +5.4 |
| | after magnetic separation | 54.3 | 42.5 | | |

It will be understood that the specification and examples are illustrative but not limitative of the present invention and that other embodiments within the spirit and scope of the invention will suggest themselves to those skilled in the art.

What is claimed is:

1. A process for increasing the color purity of iron oxide pigment particles admixed with color-modifying impurities comprising carbon and obtained by the Penniman process or the aniline process, comprising introducing the particles into a magnetic field, and collecting from the magnetic field two separate magnetic iron oxide fractions of different magnetizability, at least one fraction being iron oxide pigment particles of increased color purity.

2. A process according to claim 1, wherein the iron oxide pigment particles principally comprise iron oxide yellow pigments (α-FeOOH) and the color modifying impurities additionally comprise iron oxide black ($Fe_3O_4$).

3. A process according to claim 1, wherein the particles are introduced into the magnetic field as a suspension occurring in carrying out the Penniman or aniline process and, prior to or during introduction of the suspension into the magnetic filed, there is introduced into the suspension a treating agent, the resulting fraction thereafter being dried, the treating agent remaining with the dried fraction.

* * * * *